J. T. YOUNG.
JOURNAL BEARING.
APPLICATION FILED AUG. 3, 1920.
1,384,502.
Patented July 12, 1921.
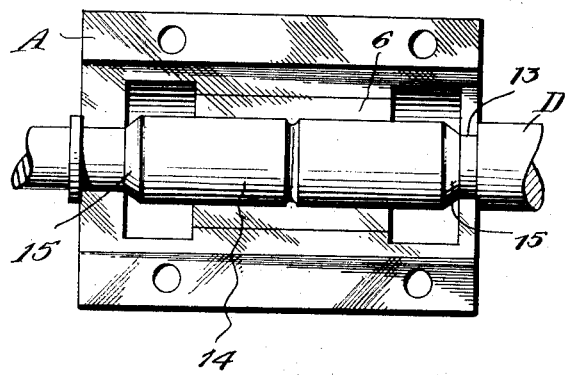
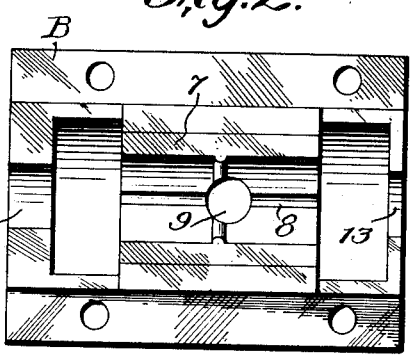
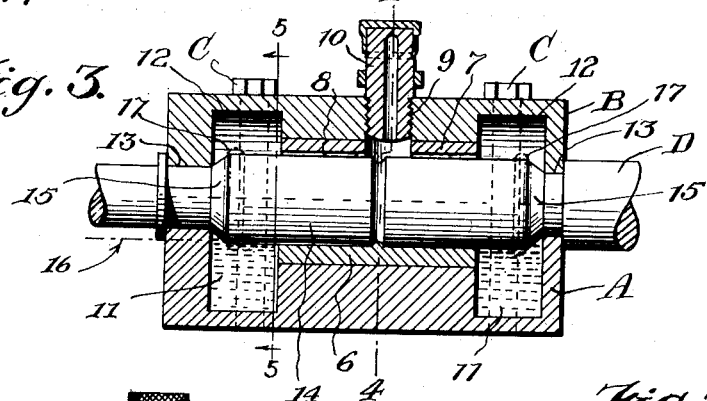
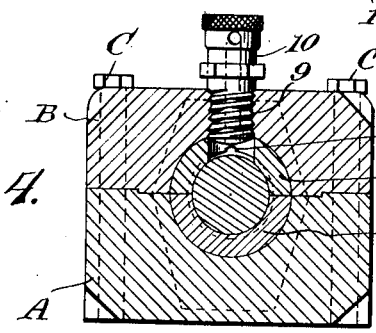
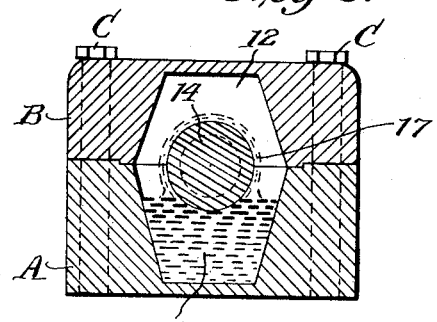
Inventor
John T. Young
By Knight Bros,
Attorneys

UNITED STATES PATENT OFFICE.

JOHN T. YOUNG, OF ELMIRA, NEW YORK.

JOURNAL-BEARING.

1,384,502. Specification of Letters Patent. Patented July 12, 1921.

Application filed August 3, 1920. Serial No. 400,896.

*To all whom it may concern:*

Be it known that I, JOHN T. YOUNG, a citizen of the United States, and resident of Elmira, in the county of Chemung and State of New York, have invented certain new and useful Improvements in Journal-Bearings, of which the following is a specification.

My invention relates to that class of journal bearings comprising a box in which a supply of oil for lubricating journals is contained, usually in the bottom thereof, and fed upwardly over the journal by a part of the shaft dipping into the oil.

By constructing a journal bearing in accordance with my invention, I am enabled to prevent the introduction of dust or sand therein, and to provide automatic lubrication without the employment of wicking or other material to absorb the lubricating material and hold it against the revolving shaft, whereby the loss rendered necessary by the employment of such means is fully obviated.

The invention resides more specifically in forming the shaft adjacent each side of the box with beveled surfaces, these beveled surfaces lying adjacent the lubricating material wells. I have found that by so constructing the shaft, the lubricating oil or other material which is picked up by the shaft as it dips into the well is caused by centrifugal action to ride up upon these beveled surfaces and form upon the shaft circumferential beads of oil. These beads of oil prevent dirt and foreign matter from working inwardly upon the shaft to the interior of the journal box.

These advantages will be made more apparent in the specification and in the drawings, in which—

Figure 1 is a top plan view of a journal box constructed in accordance with my invention, with the top cover removed;

Fig. 2 is an inverted plan view of the cover of the journal box;

Fig. 3 is a central vertical section;

Fig. 4 is a section taken on line 4—4 of Fig. 3; and

Fig. 5 is a section taken on line 5—5 of Fig. 3.

In carrying out my invention I employ a box formed preferably in two sections, in which A represents the bottom section and B the cover therefor. These two sections are secured together by means of suitable bolts C passing down through the cover portion B and into the base A.

The letter D indicates a shaft passing through and supported by this journal bearing. To accommodate the shaft and to provide bearing therefor, the base A of the box is provided with a Babbitt metal bearing plate 6, suitably secured therein, while the cover B contains a similar bearing plate of Babbitt metal 7. The plate 7 is provided with a lubricating groove 8, which communicates with an opening 9 in the cover B, through which the lubricating material may be introduced. This opening is closed by a plug 10.

The base A of the box is recessed adjacent each of its ends, as indicated at 11, and the cover B is similarly recessed, as at 12. These recesses lie adjacent one another, and therefore when the two sections of the journal box are in position, a chamber is provided about the shaft D at each end of the box. The end walls of the box are suitably apertured, as at 13, to permit the shaft D to pass therethrough.

As illustrated clearly in Fig. 3, the shaft D has the portion thereof which is contained within the journal box of a somewhat larger diameter, which is indicated by the numeral 14, than that portion of the shaft which extends through the end of the box. The shaft adjacent the ends of the box is provided with beveled surfaces 15, which bevels extend from the enlarged portion 14 to points immediately adjacent the inside of the end walls of the box.

The lubricating material, which is preferably oil, is contained in the recesses or wells 11 formed in the base A of the box. This supply of lubricating material may be replenished at any time through the opening 9 in the cover B of the box, as communication between the opening 9 and the recesses at the end of the box is provided for by the groove 8.

The lubricating material is in sufficient quantities only to bring it to the level 16, as illustrateed in Fig. 3, which level is below the aperture 13 in each end of the box. In this manner the lubricating material is prevented from escaping through the ends of the box. As the shaft is rotated it is obvious that the enlarged portion of the shaft D will dip into this lubricating material and carry the same up and around the shaft, and that the portion of the shaft contained between the two wells 11 will be thoroughly supplied with oil. By forming the bevels 15 as illustrated, oil becoming lodged upon these bevels will be caused by centrifugal force to travel inwardly and upwardly upon the beveled surfaces and form about the shaft a circumferential bead of lubricating material. This bead is illustrated at 17 by dotted lines in Fig. 3.

By reason of this circumferential bead of oil upon the shaft D, dust or other foreign material which works inwardly upon the shaft from the exterior of the box is intercepted at this point by what is in reality a wall of lubricating material. This foreign matter is subsequently deposited in the lubricant contained in the wells 11, and finally settles in the bottom of these wells, from where it may thereafter be removed. I am therefore enabled to keep the center or bearing portion of the box free from the grit and dirt which would destroy the surface of the shaft and the bearing plates.

It is apparent that my invention is not limited to any particular type or form of journal box, but contemplates the provision of beveled surfaces in connection with a shaft and supply of lubricant. Consequently, various modifications may be resorted to without departing from the spirit and scope of my invention, and I particularly reserve this right.

Having thus described my invention, what I claim is:—

1. A device of the class described comprising a box, a shaft passing therethrough and journaled therein, said box being formed with lubricant-receiving wells into which said shaft is adapted to dip, bevels formed on said shaft at points where said shafts dip into said wells, said bevels being inclined upwardly and toward the bearing point of said shaft, to cause the lubricant to form beads on said shaft.

2. In a device of the class described the combination with a journal box provided with lubricant-receiving wells and a shaft passing therethrough and journaled therein, of bevels formed upon said shaft and adjacent said lubricant-receiving wells, said bevels being inclined upwardly and toward the center of said box, said shaft adapted to dip into said wells, as and for the purpose set forth.

3. In a device of the class described a journal box, said journal box being provided with lubricant-receiving wells adjacent its ends, a shaft passing through said box and journaled therein, the portion of the shaft contained within the box being of a somewhat larger diameter than the portion adjacent the ends of the box, inwardly and upwardly inclined bevels formed on said shaft at points adjacent the lubricant-receiving wells, the enlarged portion of said shaft dipping into said wells to pick up the lubricant contained therein, the bevels causing said lubricant to ride inwardly on said shaft toward its bearing point to form circumferential beads of oil upon the shaft, substantially as and for the purpose set forth.

4. In a device of the class described a box, said box being formed with lubricant-receiving wells, a shaft passing through said box and journaled therein, inwardly and upwardly inclined bevels formed on said shaft adjacent the ends of the box, said bevels connecting reduced and enlarged portions of said shaft, the enlarged portion of said shaft being adapted to dip into said wells to pick up lubricant therefrom, which lubricant forms circumferential beads upon said shaft, said bevels preventing said oil from riding outwardly on said shafts toward the ends thereof, substantially as described.

JOHN T. YOUNG.